(12) United States Patent
Chin et al.

(10) Patent No.: US 8,335,190 B2
(45) Date of Patent: Dec. 18, 2012

(54) METHODS AND APPARATUS FOR EXTENDING THE RESOURCE RETAIN TIME IN A HANDOVER

(75) Inventors: Tom Chin, San Diego, CA (US); Guangming Carl Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 12/405,233

(22) Filed: Mar. 17, 2009

(65) Prior Publication Data

US 2010/0238898 A1    Sep. 23, 2010

(51) Int. Cl.
*H04W 4/00* (2009.01)
(52) U.S. Cl. ........ 370/331; 455/436; 455/437; 455/440; 455/438; 455/439; 455/442; 455/517
(58) Field of Classification Search .................. None
See application file for complete search history.

(56) References Cited

U.S. PATENT DOCUMENTS
2009/0122763 A1* 5/2009 Oguchi ................. 370/331

FOREIGN PATENT DOCUMENTS
EP  1816794  8/2007
WO  WO2008132163  11/2008

OTHER PUBLICATIONS

Hyun-Jin Lee et al: "A handover time negotiation mechanism for seamless service in IEEE 802.16E" Military Communications Conference, 2008. MILCOM 2008. IEEE, IEEE, Piscataway, NJ, USA, Nov. 16, 2008, pp. 1-7, XP031408413 ISBN: 978-1-4244.
International Search Report and Written Opinion—PCT/US2010/027445, International Search Authority—European Patent Office—Jul. 6, 2010.

* cited by examiner

Primary Examiner — Kibrom T Hailu
(74) Attorney, Agent, or Firm — Charles Chesney

(57) ABSTRACT

A mobile station may send a first handover indication message to a serving base station. The first handover indication message may include a first resource retain time. The mobile station may start a resource retaining timer using the first resource retain time. The mobile station may perform handover procedures. The mobile station may determine whether the resource retaining timer is within a threshold of expiring. The mobile station may send a second handover indication message to the serving base station if the resource retaining timer is within the threshold of expiring.

23 Claims, 12 Drawing Sheets

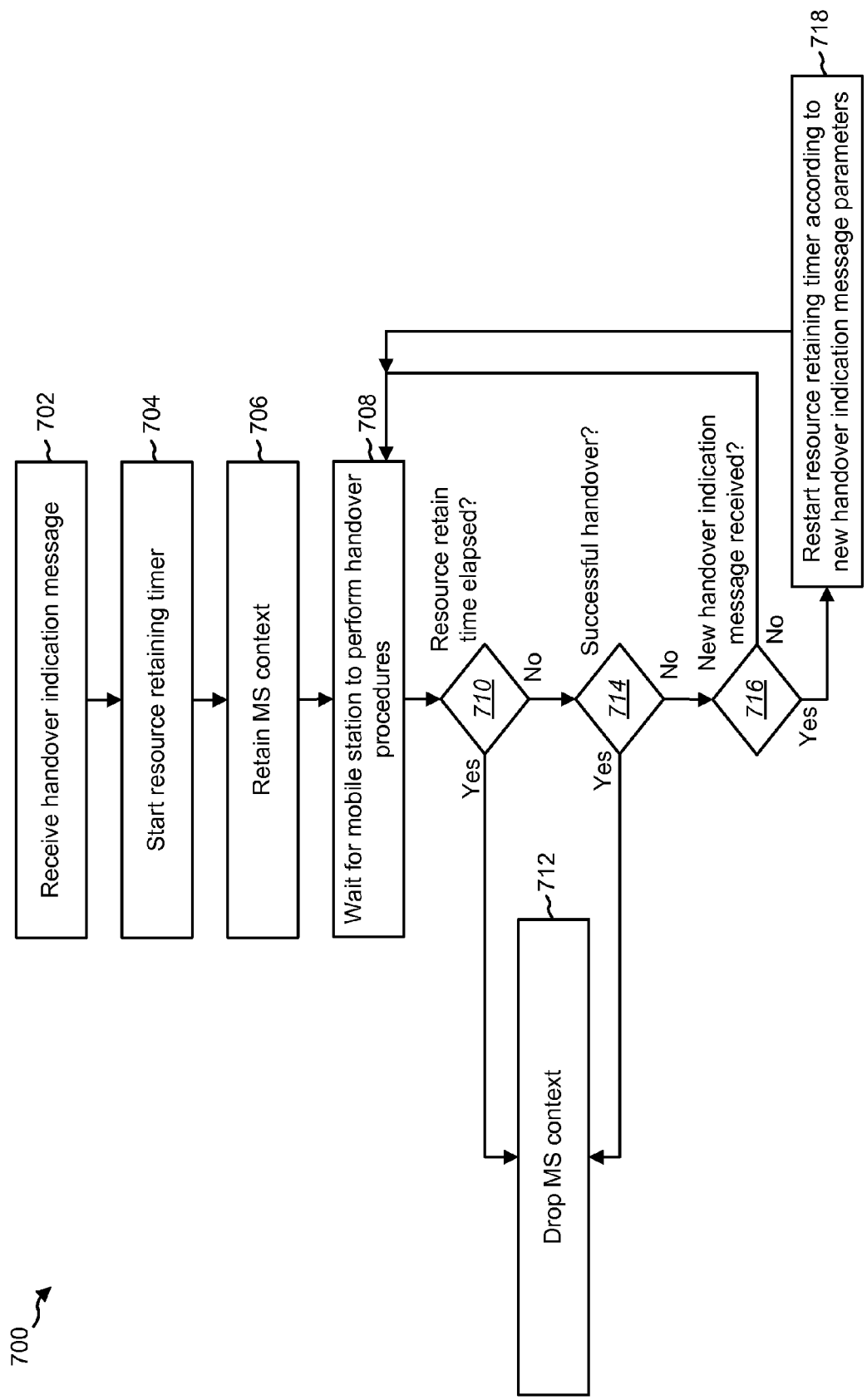

METHODS AND APPARATUS FOR EXTENDING THE RESOURCE RETAIN TIME IN A HANDOVER

TECHNICAL FIELD

The present disclosure relates generally to communication systems. More specifically, the present disclosure relates to methods and apparatus for extending the resource retain time in a handover.

SUMMARY

In certain embodiments, a method for extending a resource retain time for a serving base station in a wireless communication system is described. The method is implemented by a mobile station. A first handover indication message is sent to the serving base station. The first handover indication message includes a first resource retain time. A resource retaining timer is started using the first resource retain time. Handover procedures are performed. It is determined whether the resource retaining timer is within a threshold of expiring. A second handover indication message is sent to the serving base station if the resource retaining timer is within the threshold of expiring.

In certain embodiments, a method for extending a resource retain time for a serving base station in a wireless communication system is described. The method is implemented by the serving base station. A first handover indication message is received from a mobile station. The first handover indication message includes a first resource retain time. A resource retaining timer is started using the first resource retain time. The serving base station waits for a mobile station to perform handover procedures. A second handover indication message is received from the mobile station. The resource retaining timer is restarted.

In certain embodiments, a mobile station configured for extending a resource retain time for a serving base station in a wireless communication system is described. The mobile station includes a processor. The mobile station also includes memory in electronic communication with the processor. The mobile station further includes instructions stored in the memory. The instructions are executable by the processor to send a first handover indication message to the serving base station. The instructions are also executable to start a resource retaining timer using a first resource retain time. The instructions are further executable to perform handover procedures. The instructions are also executable to determine whether the resource retaining timer is within a threshold of expiring. The instructions are further executable to send a second handover indication message to the serving base station if the resource retaining timer is within the threshold of expiring.

In certain embodiments, a base station configured for extending a resource retain time for the base station in a wireless communication system is described. The base station includes a processor. The base station also includes memory in electronic communication with the processor. The base station further includes instructions stored in the memory. The instructions are executable by the processor to receive a first handover indication message from a mobile station. The first handover indication message includes a first resource retain time. The instructions are also executable by the processor to start a resource retaining timer using the first resource retain time. The instructions are further executable to wait for a mobile station to perform handover procedures. The instructions are also executable to receive a second handover indication message from the mobile station. The instructions are further executable to restart the resource retaining timer.

In certain embodiments, a mobile station configured for extending a resource retain time for a serving base station in a wireless communication system is described. The mobile station includes means for sending a first handover indication message to the serving base station. The first handover indication message includes a first resource retain time. The mobile station also includes means for starting a resource retaining timer using the first resource retain time. The mobile station further includes means for performing handover procedures. The mobile station also includes means for determining whether the resource retaining timer is within a threshold of expiring. The mobile station further includes means for sending a second handover indication message to the serving base station if the resource retaining timer is within the threshold of expiring.

In certain embodiments, a base station configured for extending a resource retain time for the base station in a wireless communication system is described. The base station includes means for receiving a first handover indication message from a mobile station. The first handover indication message includes a first resource retain time. The base station also includes means for starting a resource retaining timer using the first resource retain time. The base station further includes means for waiting for a mobile station to perform handover procedures. The base station also includes means for receiving a second handover indication message from the mobile station. The base station further includes means for restarting the resource retaining timer.

In certain embodiments, a computer-program product for extending a resource retain time for a serving base station in a wireless communication system is described. The computer-program product includes a computer-readable medium having instructions thereon, the instructions including code for sending a first handover indication message to the serving base station. The instructions also include code for starting a resource retaining timer using a first resource retain time. The instructions further include code for performing handover procedures. The instructions also include code for determining whether the resource retaining timer is within a threshold of expiring. The instructions further include code for sending a second handover indication message to the serving base station if the resource retaining timer is within the threshold of expiring.

In certain embodiments, a computer-program product for extending a resource retain time for a serving base station in a wireless communication system is described. The computer-program product includes a computer-readable medium having instructions thereon, the instructions including code for receiving a first handover indication message from a mobile station. The first handover indication message includes a first resource retain time. The instructions also include code for starting a resource retaining timer using the first resource retain time. The instructions further include code for waiting for a mobile station to perform handover procedures. The instructions also include code for receiving a second handover indication message from the mobile station. The instructions further include code for restarting the resource retaining timer.

In certain embodiments, as presented in the summary paragraphs above and elsewhere within this specification, the wireless communication system can support an Institute of Electronic and Electrical Engineers (IEEE) 802.16 standard.

BRIEF DESCRIPTION OF THE DRAWINGS

FIG. 7 is a flow diagram illustrating a method for extending the resource retain time by a serving base station during handover procedures;

DETAILED DESCRIPTION

Figure 1:
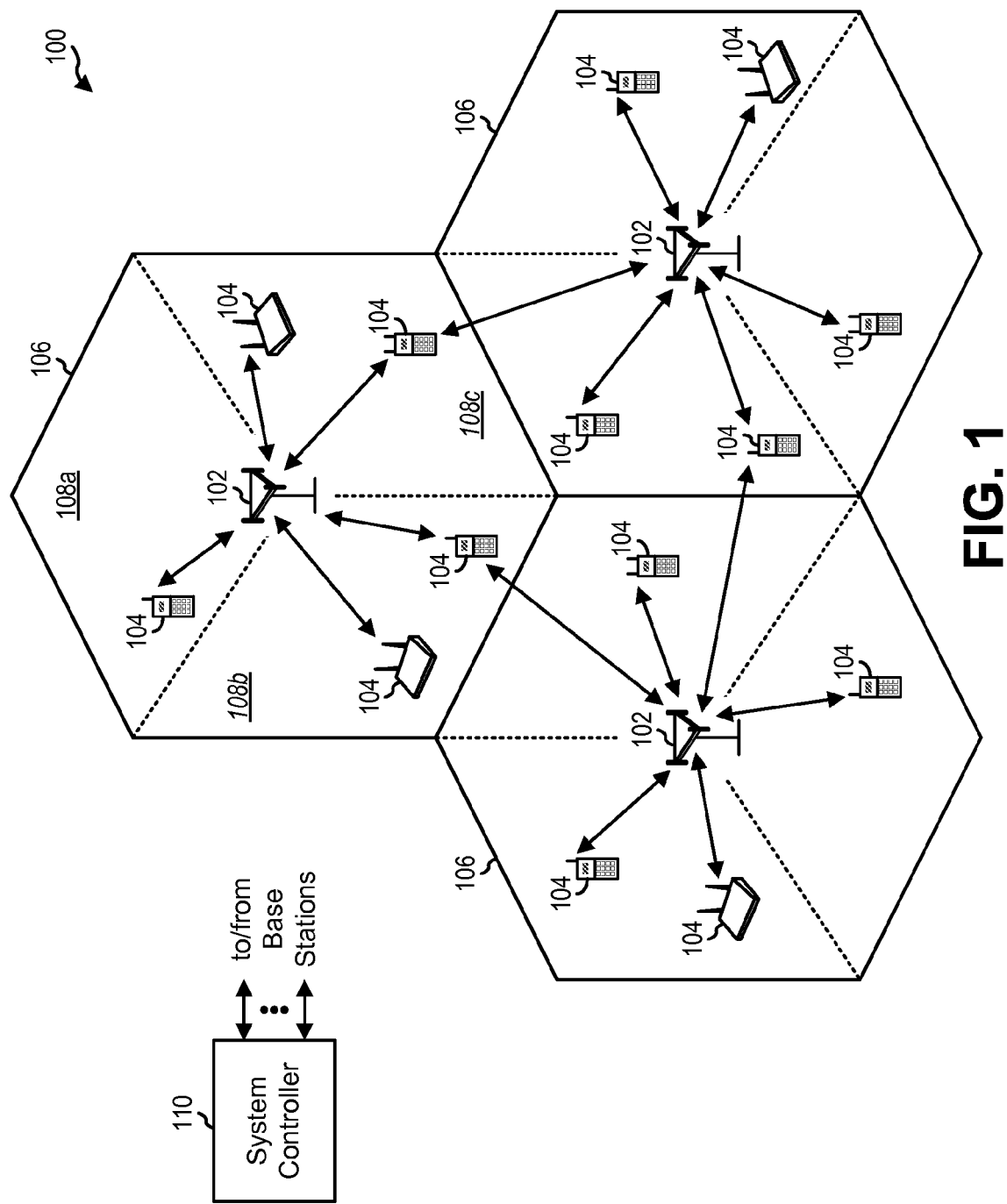
FIG. 1 shows an example of a wireless communication system in which the methods disclosed herein may be utilized.

Wireless communication systems have become an important means by which many people worldwide have come to communicate. A wireless communication system may provide communication for a number of subscriber stations, each of which may be serviced by a base station. As used herein, the term "mobile station" refers to an electronic device that may be used for voice and/or data communication over a wireless communication system. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, a mobile device, a wireless device, user equipment, or some other similar terminology. The term "base station" refers to a wireless communication station that is installed at a fixed location and used to communicate with subscriber stations. A base station may alternatively be referred to as an access point, a Node B, an evolved Node B, or some other similar terminology.

A mobile station may communicate with one or more base stations via transmissions on the uplink and the downlink. The uplink (or reverse link) refers to the communication link from the mobile station to the base station, and the downlink (or forward link) refers to the communication link from the base station to the mobile station.

The resources of a wireless communication system (e.g., bandwidth and transmit power) may be shared among multiple mobile stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

The methods and apparatus of the present disclosure may be utilized in a broadband wireless communication network. The term "broadband wireless" refers to technology that provides wireless, voice, Internet, and/or data network access over a given area.

The Institute of Electronic and Electrical Engineers (IEEE) 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances. As used herein, the term "WiMAX network" refers to a wireless communication network that is configured in accordance with one or more WiMAX standards. WiMAX is an example of a broadband wireless technology in which the methods and apparatus of the present disclosure may be utilized In a WiMAX system, a serving base station may serve one or more mobile stations. The serving base station may store the MS context for each of the served mobile stations. WiMAX standards specify that the serving base station can retain the MS context for a served mobile station when the serving base station receives a MOB_HO-IND message from the mobile station. A MOB_HO-IND message is discussed in further detail below in relation to FIG. 2.

The present disclosure relates to improved techniques for increasing the amount of time that the serving base station retains the MS context for a mobile station after the mobile station has requested a handover in time synchronous wireless communication systems, such as WiMAX systems. In accordance with the techniques disclosed herein, a mobile station may request that the serving base station retain the MS context relating to the mobile station for a longer period of time, thereby allowing the mobile station sufficient time to perform handover attempts.

FIG. 1 shows an example of a wireless communication system 100 in which the methods disclosed herein may be utilized. The wireless communication system 100 includes multiple base stations (BS) 102 and multiple mobile stations (MS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Mobile stations 104 are typically dispersed throughout the system 100. A mobile station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

Figure 2:
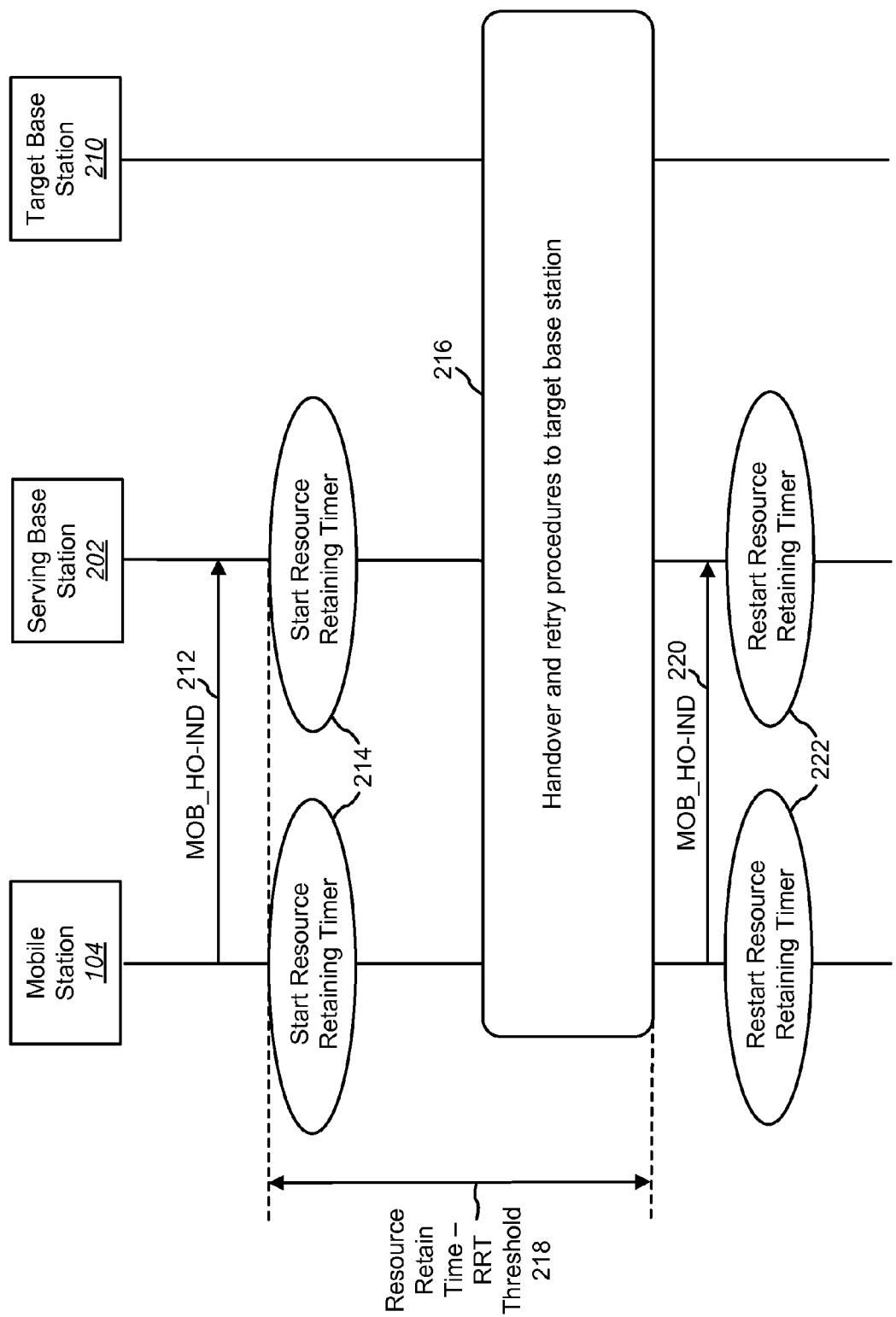
FIG. 2 illustrates a handover scheme by a mobile station from a serving base station to a target base station.

FIG. 2 illustrates a handover scheme by a mobile station 104 from a serving base station 202 to a target base station 210. The mobile station 104 may send a handover indication message 212 (i.e. MOB_HO-IND) to the serving base station 202. The handover indication message 212 may include handover parameters. For example, the handover indication message 212 may include a value for the resource retain time. The resource retain time may be the amount of time that the serving base station 202 should retain the resources for the MS context. For example, the resource retain time may specify that the serving base station should retain the MS context for 500 ms. The MS context may include communication related information about the mobile station 104. For example, a serving base station 202 may include the MS context for each mobile station 104 being served by the serving base station 202. The MS context is discussed in further detail below in relation to FIG. 4.

After the mobile station 104 has sent the handover indication message 212 to the serving base station 202, the serving base station 202 and the mobile station 104 may both start 214 a resource retaining timer. Each resource retaining timer may use the resource retain time. The mobile station 104 and the serving base station 202 may start 214 the resource retaining timer at the same time. After the mobile station 104 and the serving base station 202 have started 214 the resource retaining timer, the mobile station 104 may perform 216 handover and retry procedures. For example, the mobile station 104 may attempt to switch service from the serving base station 202 to the target base station 210.

The mobile station 104 may perform 216 handover and retry procedures for a longer amount of time than the resource retain time used by the resource retaining timers. If the mobile station 104 has not successfully switched from being served by the serving base station 202 to being served by the target base station 210 when the resource retaining timers have expired, the serving base station 202 may drop the MS context. If the serving base station 202 has dropped the MS context, the mobile station 104 may not be able to return to being served by the serving base station 202. Furthermore, the mobile station 104 may not be able to perform handover procedures to base stations other than the target base station 210.

In order to allow the mobile station 104 sufficient time to perform a handover, it may be beneficial for the serving base station 202 to allow the mobile station 104 additional time to perform 216 handover procedures. For example, it may be beneficial for the serving base station 202 to extend the resource retain time used by the resource retaining timer. A mobile station 104 may request an extension of the resource retain time if the mobile station 104 needs more time to perform 216 handover procedures. A mobile station 104 may request an extension of the resource retain time if the resource retaining timer is within a threshold from expiring. For example, the mobile station 104 may request an extension of the resource retain time if the resource retaining timer is with a resource retain time (RRT) threshold of expiring. In other words, a mobile station 104 may request an extension of the resource retain time if the difference 218 between the resource retain time and the RRT threshold has elapsed.

If the resource retaining timer is within a RRT threshold of expiring and the mobile station 104 has not yet completed a handover, the mobile station 104 may extend the resource retain time. The RRT threshold may be a preset amount of time before the expiration of the resource retaining timer where the mobile station 104 can extend the resource retain time. The RRT threshold may be referred to by the variable D.

To extend the resource retain time used by the resource retaining timer on the serving base station 202, the mobile station 104 may send one or more additional handover indication messages 220 to the serving base station 202. Each additional handover indication message 220 may instruct the serving base station 202 concerning the resource retain time. For example, each additional handover indication message 220 may include a new value for the resource retain time. After an additional handover indication message 220 has been sent to the serving base station 202, both the mobile station 104 and the serving base station 202 may restart 222 the resource retaining timers. The mobile station 104 and the serving base station 202 may restart 222 the resource retaining timers using the new value for the resource retain time.

Figure 3:
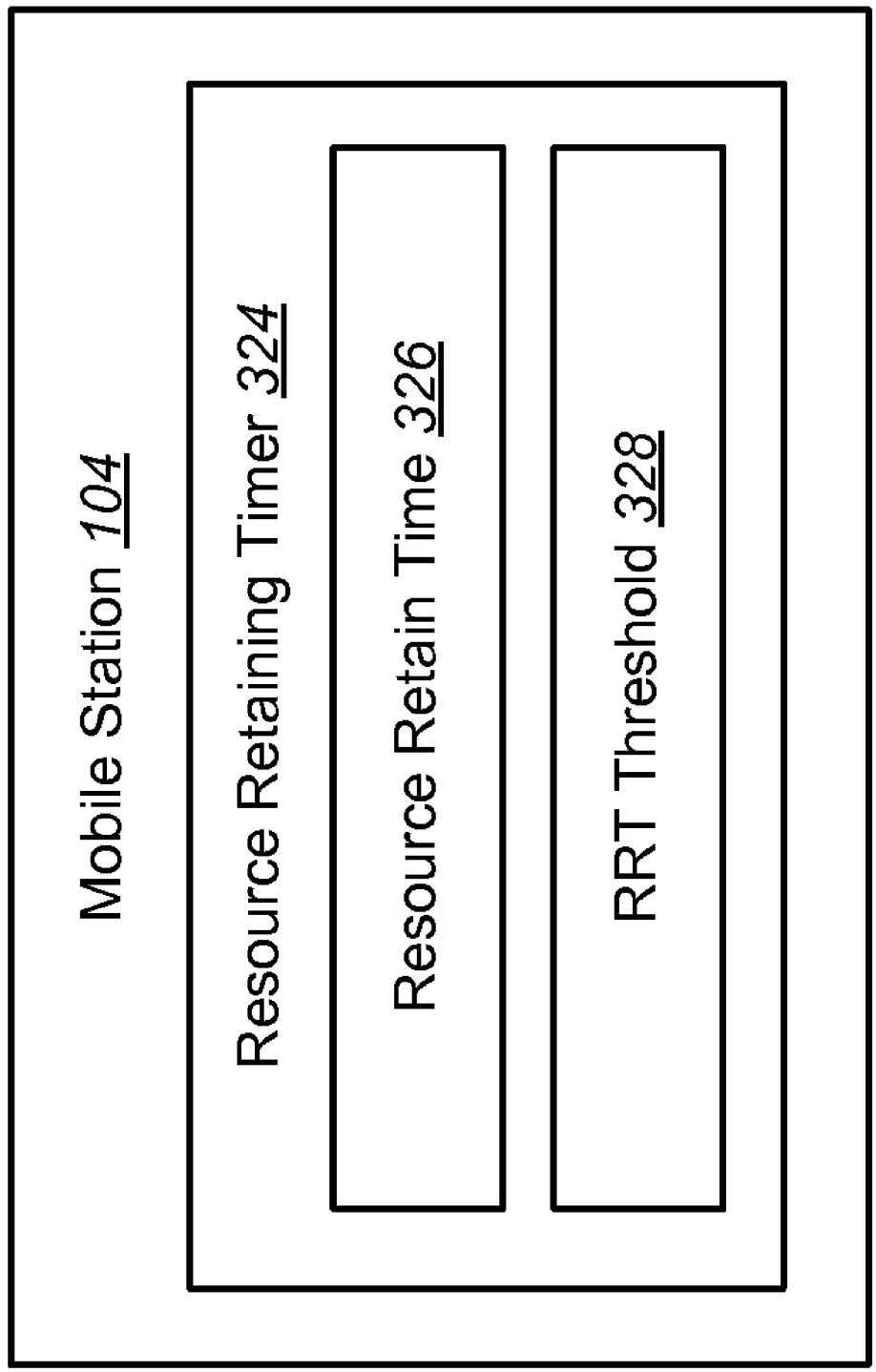
FIG. 3 is a block diagram illustrating components that may be part of a mobile station.

FIG. 3 is a block diagram illustrating components that may be part of a mobile station 104. The mobile station 104 may include a resource retaining timer 324. The resource retaining timer 324 may allow the mobile station 104 to determine how long the serving base station 202 will retain the MS context. The resource retaining timer 324 may include a resource retain time 326. The resource retain time 326 may specify the amount of time that the resource retaining timer 324 will run. For example, when the mobile station 104 starts the resource retaining timer 324, the resource retaining timer 324 may run for the period of time specified in the resource retain time 326.

The value of the resource retain time 326 may be predetermined. For example, every mobile station 104 may have a preset resource retain time 326. Alternatively, the resource retain time 326 may be adjusted by each mobile station 104 according to the circumstances of the mobile station 104. Thus, a mobile station 104 may increase or decrease the resource retain time 326 as necessary.

The resource retaining timer 324 may also include a resource retain time (RRT) threshold 328. The RRT threshold 328 may be a smaller value than the resource retain time 326. The RRT threshold 328 may define the time when a request for an extension of the resource retain time 328 by the mobile station 104 may be triggered. The RRT threshold 328 may be the amount of time before the expiration of the resource retaining timer 324 at which the mobile station 104 may request an extension of the resource retain time 326 from the serving base station 202.

Figure 4:
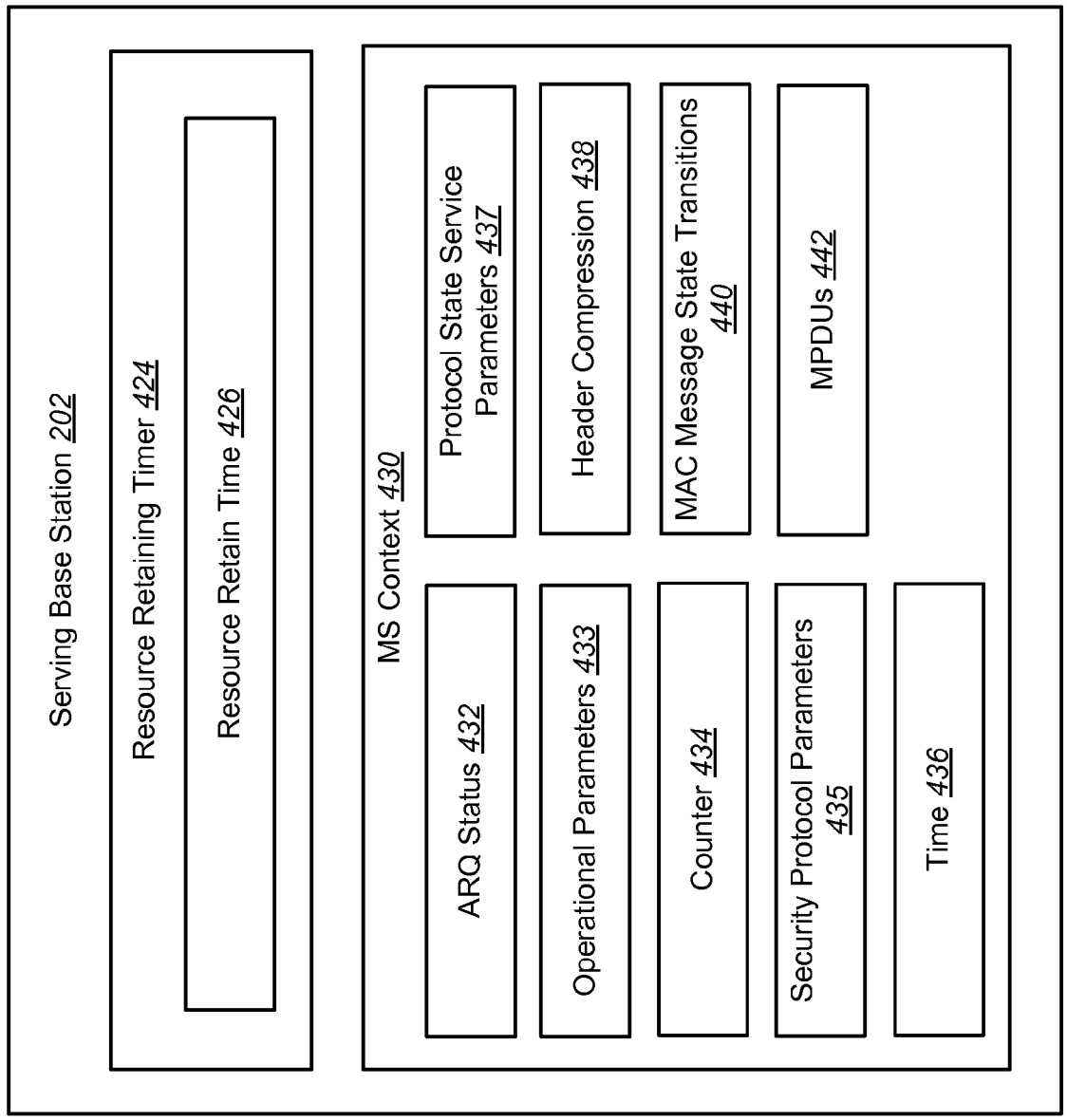
FIG. 4 is a block diagram illustrating components that may be part of a serving base station.

FIG. 4 is a block diagram illustrating components that may be part of a serving base station 202. The serving base station 202 may include a resource retaining timer 424. The resource retaining timer 424 may allow the serving base station 202 to determine when to release the MS context 430 for a mobile station 104 that is attempting a handover. The resource retaining timer 424 may include a resource retain time 426. The resource retain time 426 may indicate the amount of time that the serving base station 202 is to retain the MS context 430.

The serving base station 202 may receive the resource retain time 426 from a mobile station 104. For example, the serving base station 202 may receive the resource retain time 426 from a mobile station 104 as part of a handover indication message 212 sent to the serving base station 202 from the mobile station 104. The resource retain time 426 may be received as a type length value (TLV) item within a handover indication message 212. A TLV item is discussed in further detail below in relation to FIG. 8. Alternatively, the serving base station 202 may use a previously stored resource retain time 426. A previously stored resource retain time 426 may have been received from a mobile station 104 as part of a previous handover indication message 212. Alternatively still, a serving base station 202 may use a standard resource retain time 426 that is predefined for all base stations. The serving base station 202 may use a different resource retaining timer 424 for each mobile station 104 being served by the serving base station 202. Thus, although not shown, the serving base station 202 may include multiple resource retaining timers 424 and multiple resource retain times 426.

The serving base station 202 may include the MS context 430. The MS context 430 may be specific for each mobile station 104 served by the serving base station 202. Thus, although not shown, the serving base station 202 may include multiple MS contexts 430. An MS context 430 may include information for communicating with a mobile station 104. The MS context 430 may include physical (PHY) and media access control (MAC) layer capabilities. The MS context 430 may include operational parameters 433 negotiated through Subscriber Basic Capability (SBC) and Registration (REG) procedures. The MS context 430 may further include security protocol parameters 435 and protocol state service parameters 437 (e.g., service flow type, quality of service (QoS) parameters, convergence sublayer specifications). The MS context 430 may also include the automatic repeat request (ARQ) status 432, the header compression 438, a counter 434, and a timer 436. The MS context 430 may further include MAC message state transitions 440. The MS context 430 may also include MAC protocol data units (MPDUs) 442 and pending MPDUs.

Figure 5:
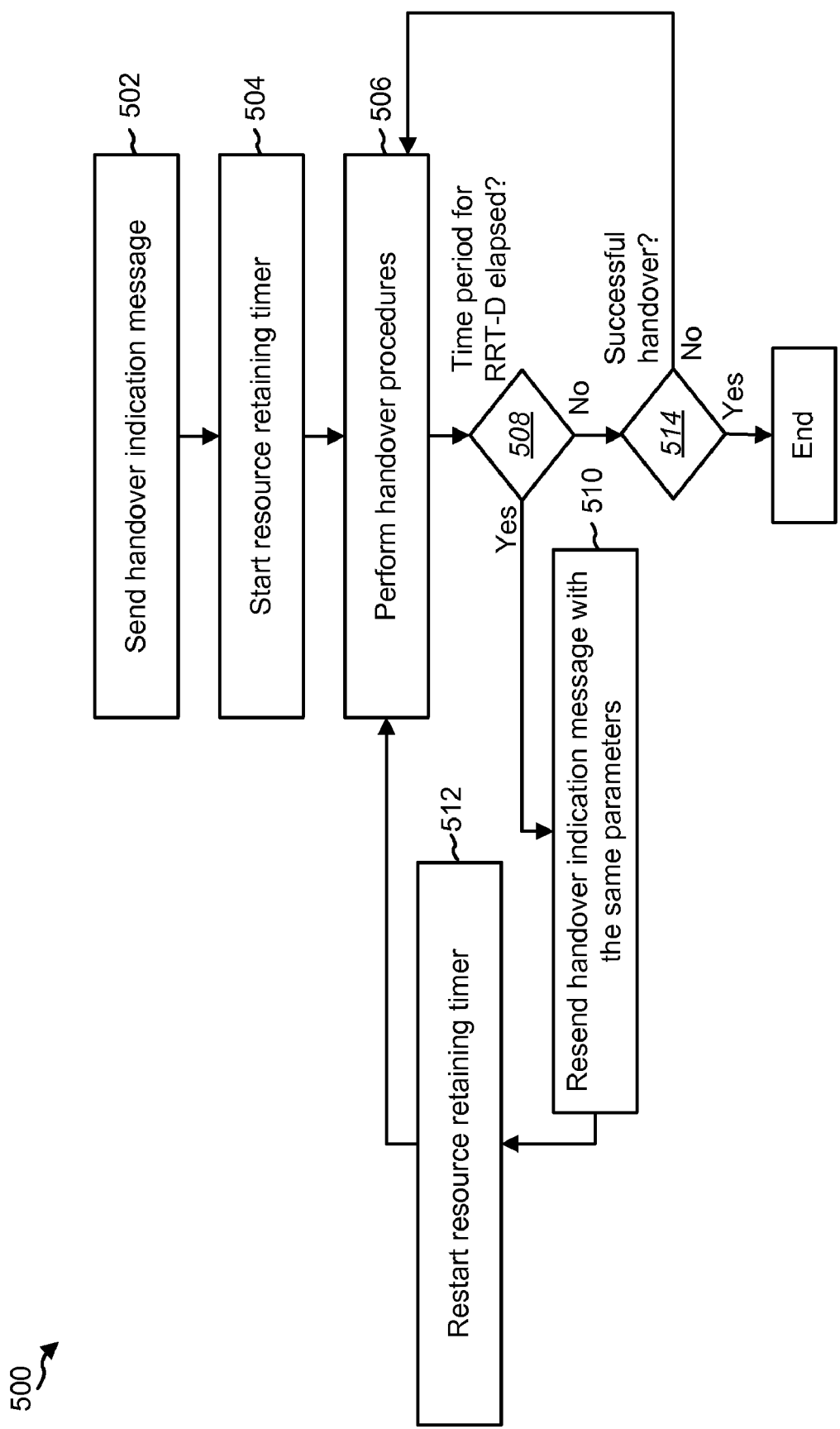
FIG. 5 is a flow diagram illustrating a method for extending the resource retain time by a mobile station during handover procedures.

FIG. 5 is a flow diagram illustrating a method 500 for extending the resource retain time 326 by a mobile station 104 during handover procedures. A mobile station 104 may send 502 a handover indication message 212 (i.e. MOB_HO-IND) to the serving base station 202. The mobile station 104 may then start 504 the resource retaining timer 324. The mobile station 104 may next perform 506 handover procedures. For example, the mobile station 104 may perform handover attempts and/or retry handover attempts.

The mobile station 104 may then determine 508 whether the time period for the resource retain time 326 minus a RRT threshold 328 has elapsed. In other words, the mobile station 104 may determine whether the resource retaining timer 324 is set to expire within the RRT threshold 328. If the time period for the resource retain time 326 minus the RRT threshold 328 has elapsed, the mobile station 104 may resend 510 the handover indication message 212 to the serving base station 202. The mobile station 104 may resend 510 the handover indication message 212 with the same parameters as the original handover indication message 212. The mobile station 104 may then restart 512 the resource retaining timer 324 using the same parameters. For example, the mobile station 104 may restart 512 the resource retaining timer 504 using the same resource retain time 326. The mobile station 104 may then perform 506 handover procedures.

If the time period for the resource retain time 326 minus the RRT threshold 328 has not yet elapsed, the mobile station 104 may determine 514 whether a successful handover has occurred. If a successful handover has not occurred, the mobile station 104 may return to performing 506 handover procedures. If a successful handover has occurred, then the mobile station 104 has successfully switched to the target base station 210.

Figure 5A:
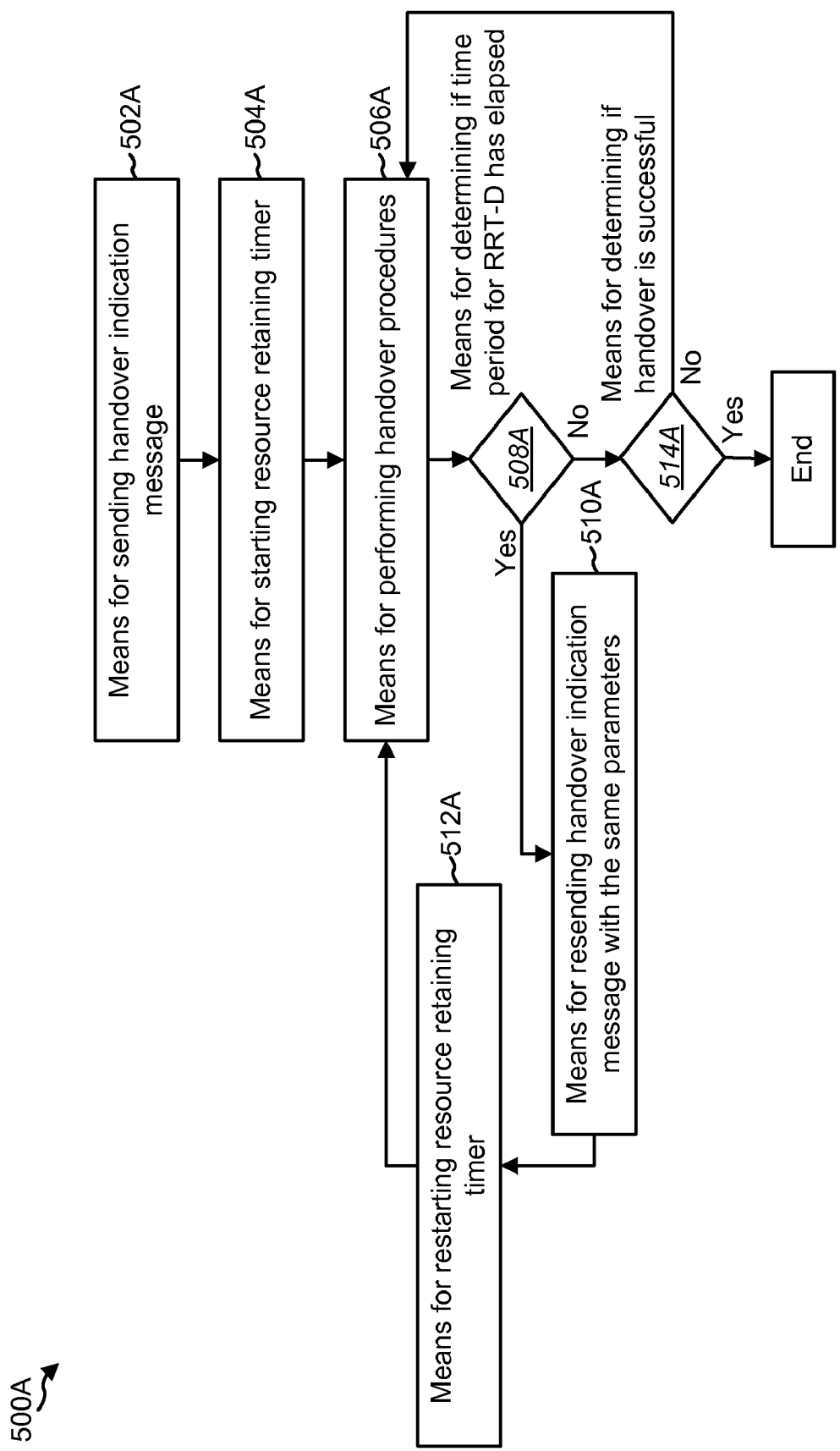
FIG. 5A illustrates means-plus-function blocks corresponding to the method of FIG. 5.

The method 500 of FIG. 5 described above may be performed by various hardware and/or software component(s) and/or module(s) corresponding to the means-plus-function blocks 500A illustrated in FIG. 5A. In other words, blocks 502 through 514 illustrated in FIG. 5 correspond to means-plus-function blocks 502A through 514A illustrated in FIG. 5A.

Figure 6:
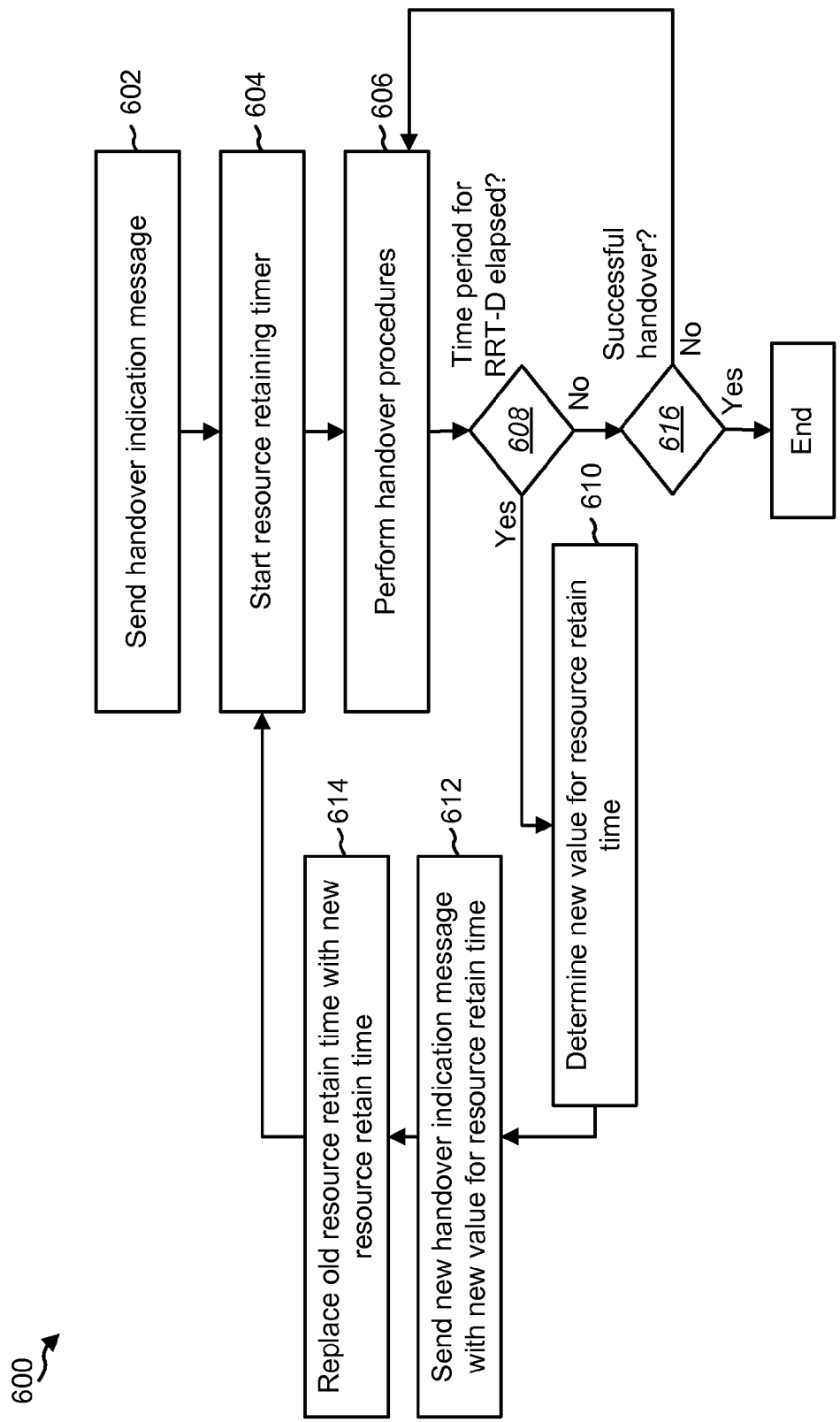
FIG. 6 is a flow diagram illustrating an alternative method for extending the resource retain time by a mobile station during handover procedures.

FIG. 6 is a flow diagram illustrating an alternative method 600 for extending the resource retain time 326 by a mobile station 104 during handover procedures. The mobile station 104 may send 602 a handover indication message 212. The mobile station 104 may then start 604 a resource retaining timer 324. The resource retaining timer 324 may use a resource retain time 326 included in the handover indication message 212. After the resource retaining timer 324 has started, the mobile station 104 may perform 606 handover procedures. For example, the mobile station 104 may make attempts to switch from communications with a serving base station 202 to communications with a target base station 210.

The mobile station 104 may next determine 608 whether the time period for the resource retain time 326 minus the RRT threshold 328 has elapsed. If the time period for the resource retain time 326 minus the RRT threshold 328 has elapsed, the serving base station 202 may soon drop the MS context 430. In order for the mobile station 104 to return to being served by the serving base station 202 if a handover is not successful, and thereby improve the robustness of the handover procedure, the serving base station 202 may retain the MS context 430 for the mobile station 104. For example, if a handover to the target base station 210 fails, the mobile station 104 may need to return to communications with the serving base station 202. In order for the mobile station 104 to perform an uncontrolled handover (i.e. handover to a target base station 210 that was not specified in the handover indication message 212), the serving base station 202 may need to retain the MS context 430 for the mobile station 104. However, the serving base station 202 may stop retaining the MS context 430 when the mobile station 104 has completed a handover to another base station or when the resource retaining timer 424 has expired.

If the time period for the resource retain time 326 minus the RRT threshold 328 has elapsed, the mobile station 104 may determine 610 a new value for the resource retain time 326. For example, the mobile station 104 may increase the resource retain time 326 by a preset amount. The mobile station 104 may then send 612 a new handover indication message 220 with the new value for the resource retain time 326 to the serving base station 202. The new value for the resource retain time 326 may be sent as a TLV item within the handover indication message 220. The mobile station 104 may also replace 614 the older resource retain time 326 with the new resource retain time 326. The mobile station 104 may then start 604 the resource retaining timer 324 using the new resource retain time 326.

If the time period for the resource retain time 326 minus the RRT threshold 328 has not elapsed, the mobile station 104 may determine 616 whether a successful handover has occurred. If a successful handover has not occurred, the mobile station 104 may continue to perform 606 handover procedures. If a successful handover has occurred, the mobile station 104 has successfully switched to a base station other than the serving base station 202.

Figure 6A:
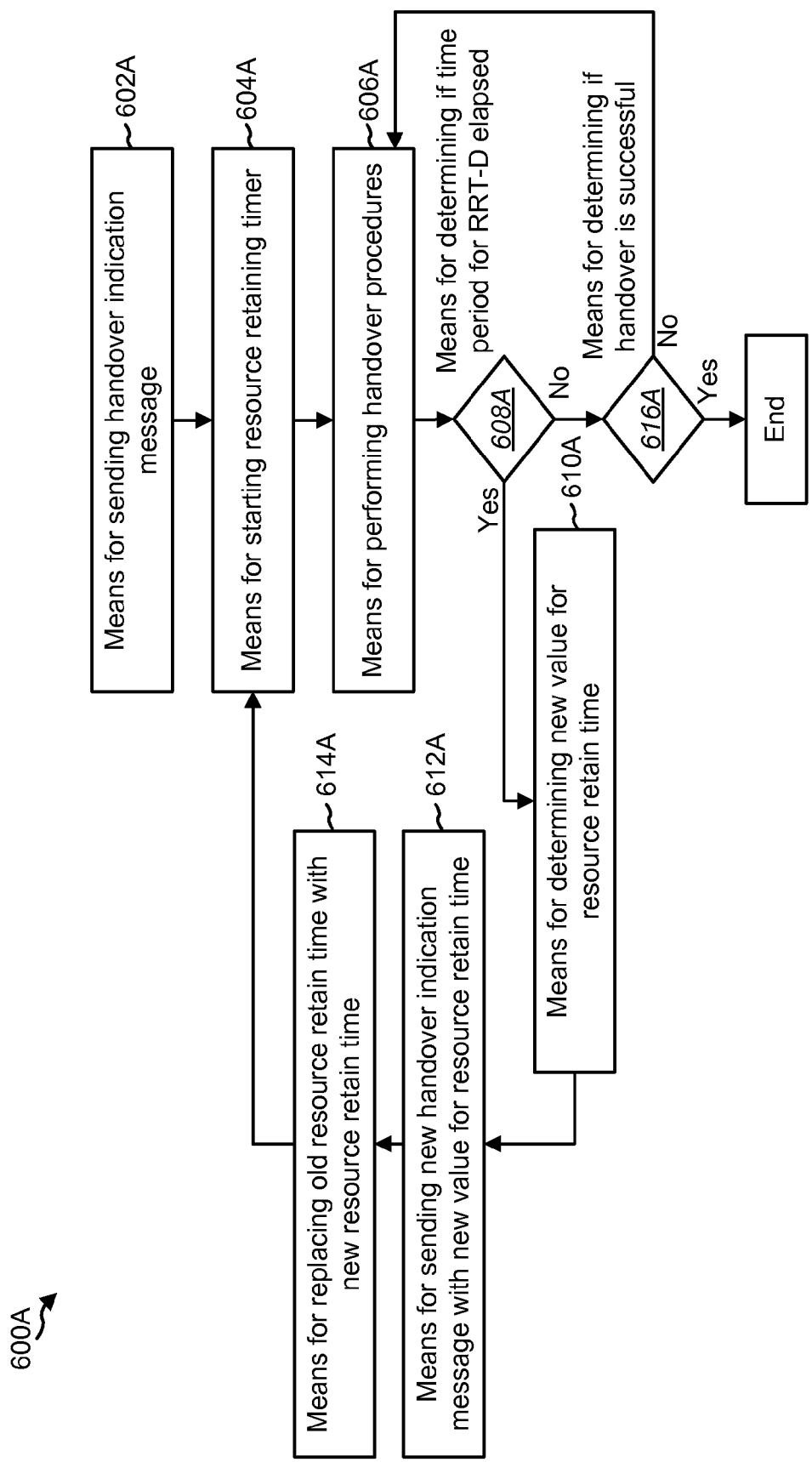
FIG. 6A illustrates means-plus-function blocks corresponding to the method of FIG. 6.

The method 600 of FIG. 6 described above may be performed by various hardware and/or software component(s) and/or module(s) corresponding to the means-plus-function blocks 600A illustrated in FIG. 6A. In other words, blocks 602 through 616 illustrated in FIG. 6 correspond to means-plus-function blocks 602A through 616A illustrated in FIG. 6A.

FIG. 7 is a flow diagram illustrating a method 700 for extending the resource retain time 426 by a serving base station 202 during handover procedures. The serving base station 202 may receive 702 a handover indication message 212 from a mobile station 104 which is being served by the serving base station 202. The serving base station 202 may then start 704 the resource retaining timer 424. The serving base station 202 may use the resource retain time 426 included within the received handover indication message 212 for the resource retaining timer 424. The serving base station 202 may include the MS context 430. The serving base station 202 may continue to retain 706 the MS context 430 for the mobile station 104.

The serving base station 202 may next wait 708 for the mobile station 104 to perform handover procedures. The serving base station 202 may then determine 710 if the resource retain time 426 in the resource retaining timer 424 has elapsed. In other words, the serving base station 202 may determine if the resource retaining timer 424 has expired. If the resource retain time 426 has elapsed, the serving base station 202 may drop 712 the MS context 430. For example, the serving base station 202 may delete the MS context 430 from the resources storing the MS context 430. If the resource retain time 426 in the resource retaining timer 424 has not elapsed, the serving base station 202 may then determine 714 if a successful handover by the mobile station 104 has occurred. If a successful handover by the mobile station 104 has occurred, the serving base station 202 may drop 712 the MS context 430.

If a successful handover by the mobile station 104 has not occurred, the serving base station 202 may then determine 716 if a new handover indication message 220 has been received. If a new handover indication message 220 has not been received, the serving base station 202 may continue to wait 708 for the mobile station 104 to perform handover procedures. If a new handover indication message 220 has been received, the serving base station 202 may restart 718 the resource retaining timer 424 according to the parameters in the new handover indication message 220. For example, if the new handover indication message 220 includes a new resource retain time 426 TLV, the serving base station 202 may restart 718 the resource retaining timer 424 using the new resource retain time 426 TLV.

Figure 7A:
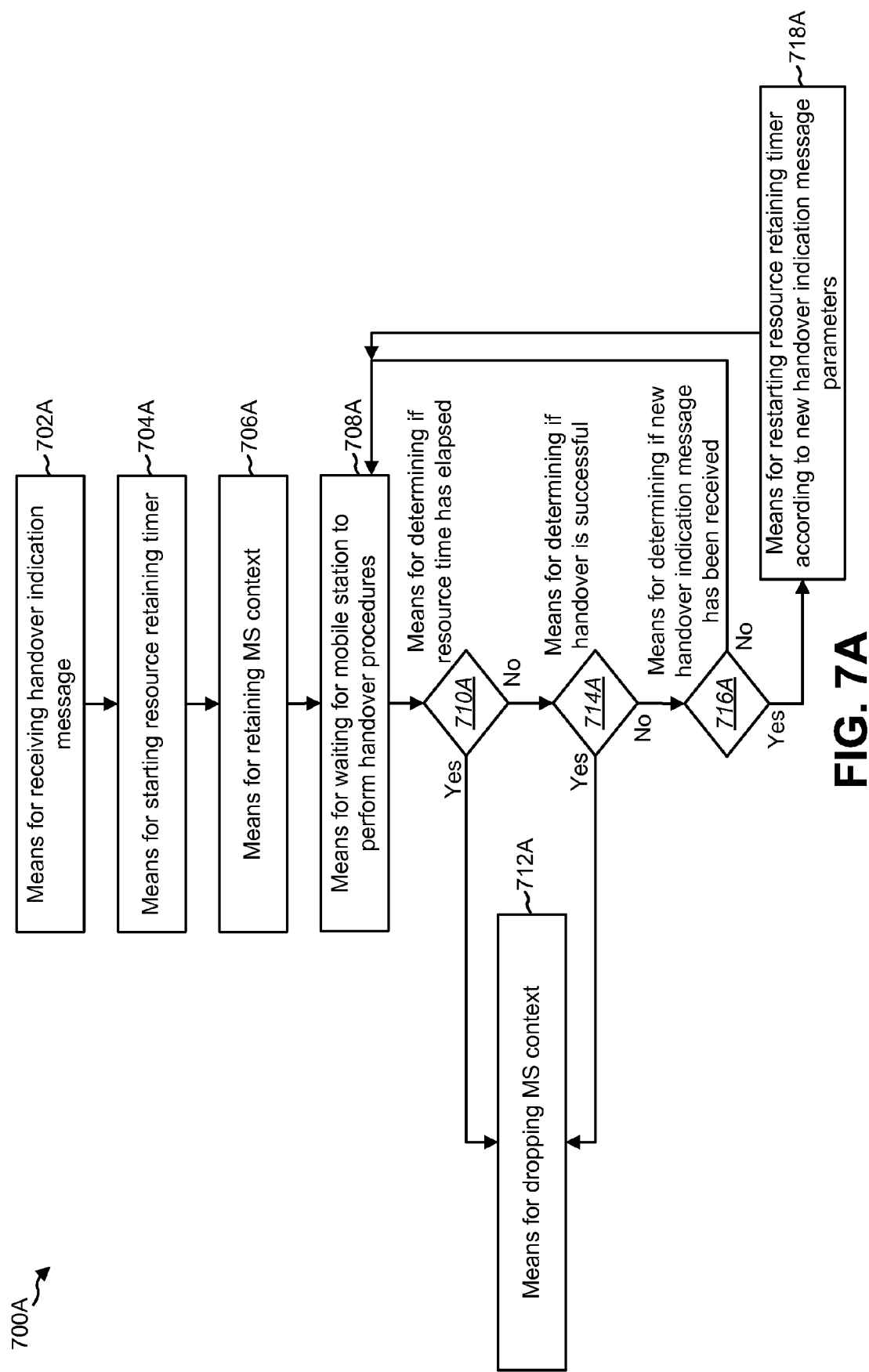
FIG. 7A illustrates means-plus-function blocks corresponding to the method of FIG. 7.

The method 700 of FIG. 7 described above may be performed by various hardware and/or software component(s) and/or module(s) corresponding to the means-plus-function blocks 700A illustrated in FIG. 7A. In other words, blocks 702 through 718 illustrated in FIG. 7 correspond to means-plus-function blocks 702A through 718A illustrated in FIG. 7A.

Figure 8:
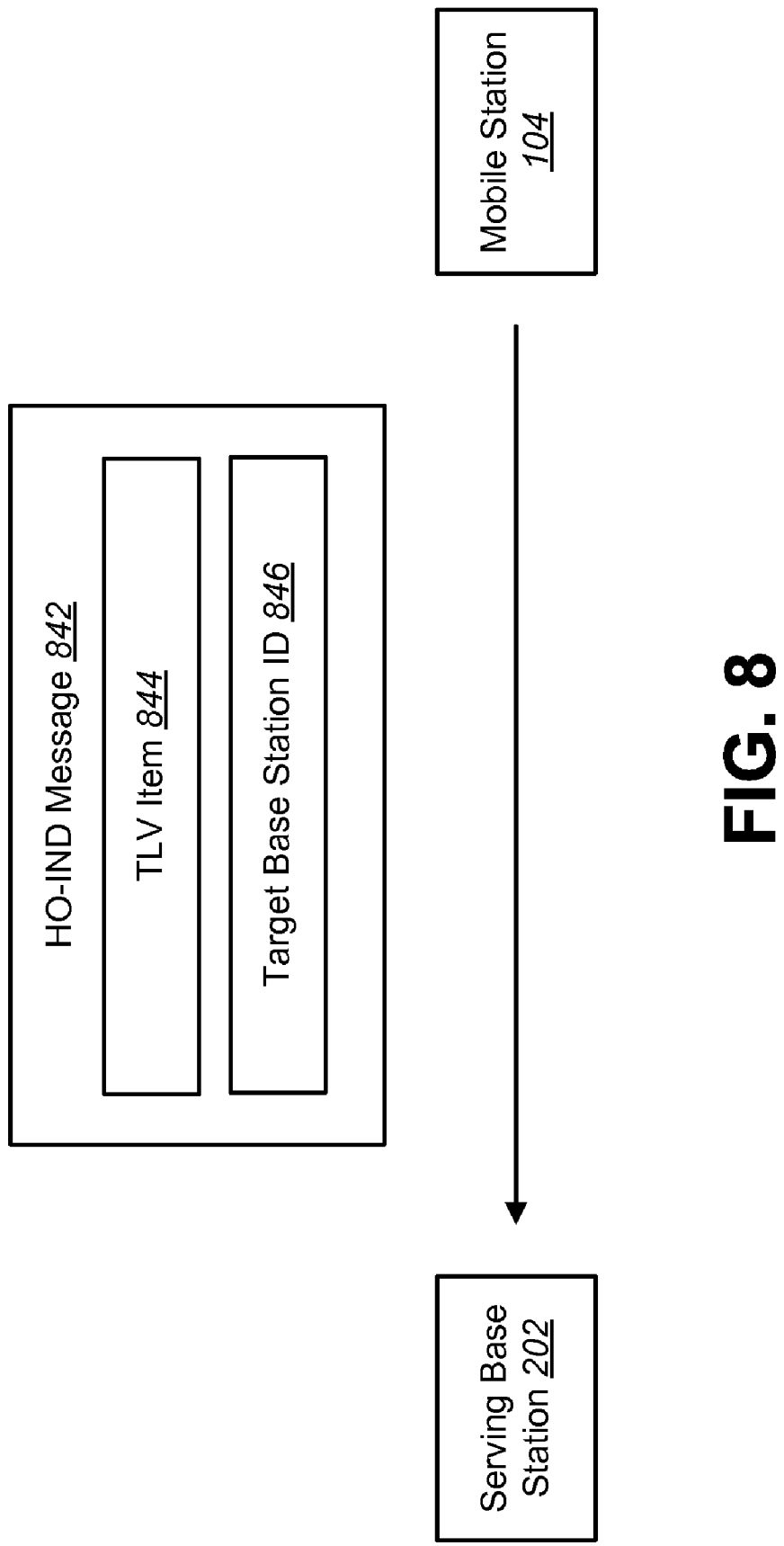
FIG. 8 illustrates a mobile station sending a handover indication message (e.g. HO_IND) to a serving base station.

FIG. 8 illustrates a mobile station 104 sending a handover indication message 842 (e.g. HO_IND) to a serving base station 202. A handover indication message 842 may be a final indication that a handover will soon occur. For example, a handover indication message 842 may indicate that a handover is expected to occur within a specified amount of time. The handover indication message 842 may include a type length value (TLV) item 844. Within a handover indication message 842, information may be encoded according to the TLV format. In the TLV format, the type and length fields may be fixed in size, indicating the type of information represented by the TLV item 844 and the size of the value field. The value field may include the data for the particular TLV item 844. The TLV item 844 may be encoded according to the TLV format.

The TLV item 844 in the handover indication message 842 may be the resource retain time 326 used by the mobile station 104. Thus, the type field of the TLV item 844 may indicate that the TLV item 844 is a resource retain time 326 and the value field may indicate the value of the resource retain time 326.

A handover indication message 842 may include additional information. For example, a handover indication message 842 may include the target base station ID 846. The target base station ID 846 may identify the target base station 210 that the mobile station 104 will attempt a handover to.

Figure 9:
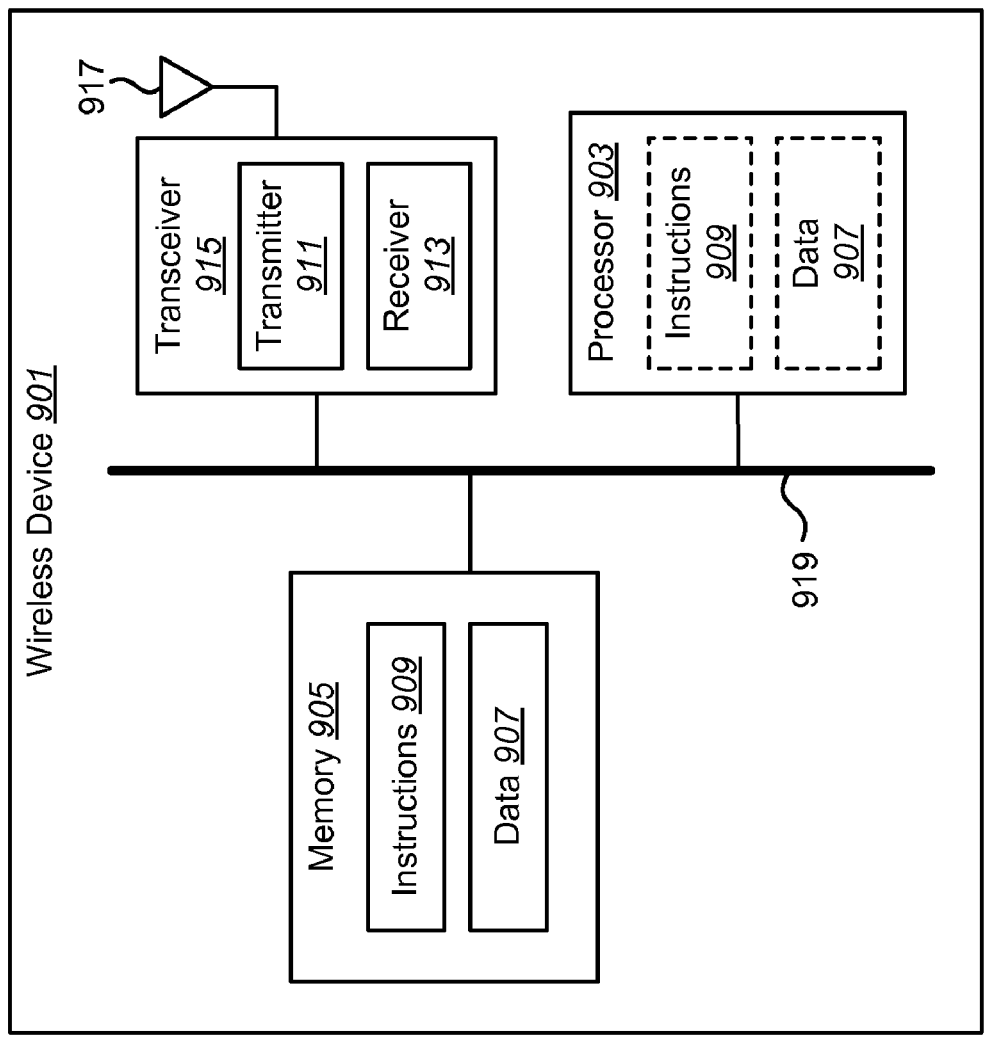
FIG. 9 illustrates certain components that may be included within a wireless device.

FIG. 9 illustrates certain components that may be included within a wireless device 901. The wireless device 901 may be a mobile station or a base station.

The wireless device 901 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless device 901 of FIG. 9, in an alternative configuration, a combination of processors (e.g., an ARM and DSP) could be used.

The wireless device 901 also includes memory 905. The memory 905 may be any electronic component capable of storing electronic information. The memory 905 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 907 and instructions 909 may be stored in the memory 905. The instructions 909 may be executable by the processor 903 to implement the methods disclosed herein. Executing the instructions 909 may involve the use of the data 907 that is stored in the memory 905.

The wireless device 901 may also include a transmitter 911 and a receiver 913 to allow transmission and reception of signals between the wireless device 901 and a remote location. The transmitter 911 and receiver 913 may be collectively referred to as a transceiver 915. An antenna 917 may be electrically coupled to the transceiver 915. The wireless device 901 may also include (not shown) multiple transmitters, multiple receivers, multiple transceivers and/or multiple antenna.

The various components of the wireless device 901 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 5, FIG. 6, and FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for extending a resource retain time for a serving base station in a wireless communication system, the method being implemented by a mobile station, the method comprising:
   sending a first handover indication message to the serving base station, wherein the first handover indication message includes a first resource retain time;
   starting a resource retaining timer using the first resource retain time;
   performing handover procedures;
   determining whether the resource retaining timer is within a threshold of expiring;
   sending a second handover indication message including a second resource retain time to the serving base station if the resource retaining timer is within the threshold of expiring; and
   restarting the resource retaining timer using the second resource retain time.

2. The method of claim 1, wherein the first resource retain time defines the amount of time the serving base station will retain an MS context corresponding to the mobile station.

3. The method of claim 1, wherein the second resource retain time and the first resource retain time have the same value.

4. A method for extending a resource retain time for a serving base station in a wireless communication system, the method being implemented by the serving base station, the method comprising:
   receiving a first handover indication message from a mobile station, wherein the first handover indication message includes a first resource retain time;

starting a resource retaining timer using the first resource retain time;
waiting for the mobile station to perform handover procedures;
receiving a second handover indication message including a second resource retain time from the mobile station; and
restarting the resource retaining timer using the second resource retain time.

5. The method of claim 4, wherein the second resource retain time and the first resource retain time have the same value.

6. The method of claim 4, further comprising retaining an MS context corresponding to the mobile station until the resource retaining timer has expired.

7. The method of claim 6, further comprising dropping the MS context corresponding to the mobile station if the resource retaining timer has expired.

8. A mobile station configured for extending a resource retain time for a serving base station in a wireless communication system, comprising:
a processor;
memory in electronic communication with the processor; and
instructions stored in the memory, the instructions being executable by the processor to:
send a first handover indication message to the serving base station, wherein the first handover indication message includes a first resource retain time;
start a resource retaining timer using the first resource retain time;
perform handover procedures;
determine whether the resource retaining timer is within a threshold of expiring;
send a second handover indication message including a second resource retain time to the serving base station if the resource retaining timer is within the threshold of expiring; and
restart the resource retaining timer using the second resource retain time.

9. The mobile station of claim 8, wherein the first resource retain time defines the amount of time the serving base station will retain an MS context corresponding to the mobile station.

10. The mobile station of claim 8, wherein the second resource retain time and the first resource retain time have the same value.

11. A base station configured for extending a resource retain time for the base station in a wireless communication system, comprising:
a processor;
memory in electronic communication with the processor; and
instructions stored in the memory, the instructions being executable by the processor to:
receive a first handover indication message from a mobile station, wherein the first handover indication message includes a first resource retain time;
start a resource retaining timer using the first resource retain time;
wait for the mobile station to perform handover procedures;
receive a second handover indication message including a second resource retain time from the mobile station; and
restart the resource retaining timer using the second resource retain time.

12. The base station of claim 11, wherein the second resource retain time and the first resource retain time have the same value.

13. The base station of claim 11, wherein the instructions are further executable to retain an MS context corresponding to the mobile station until the resource retaining timer has expired.

14. The base station of claim 13, wherein the instructions are further executable to drop the MS context corresponding to the mobile station if the resource retaining timer has expired.

15. A mobile station configured for extending a resource retain time for a serving base station in a wireless communication system, comprising:
means for sending a first handover indication message to the serving base station, wherein the first handover indication message includes a first resource retain time;
means for starting a resource retaining timer using the first resource retain time;
means for performing handover procedures;
means for determining whether the resource retaining timer is within a threshold of expiring;
means for sending a second handover indication message including a second resource retain time to the serving base station if the resource retaining timer is within the threshold of expiring; and
means for restarting the resource retaining timer using the second resource retain time.

16. The mobile station of claim 15, wherein the first resource retain time defines the amount of time the serving base station will retain an MS context corresponding to the mobile station.

17. The mobile station of claim 15, wherein the second resource retain time and the first resource retain time have the same value.

18. A base station configured for extending a resource retain time for the base station in a wireless communication system, comprising:
means for receiving a first handover indication message from a mobile station, wherein the first handover indication message includes a first resource retain time;
means for starting a resource retaining timer using the first resource retain time;
means for waiting for the mobile station to perform handover procedures;
means for receiving a second handover indication message including a second resource retain time from the mobile station; and
means for restarting the resource retaining timer using the second resource retain time.

19. The base station of claim 18, wherein the second resource retain time and the first resource retain time have the same value.

20. The base station of claim 18, further comprising means for retaining an MS context corresponding to the mobile station until the resource retaining timer has expired.

21. The base station of claim 20, further comprising means for dropping the MS context corresponding to the mobile station if the resource retaining timer has expired.

22. A computer-program product for extending a resource retain time for a serving base station in a wireless communication system, the computer-program product comprising a non-transitory computer-readable medium having instructions thereon, the instructions comprising:
code for sending a first handover indication message to the serving base station, wherein the first handover indication message includes a first resource retain time;

code for starting a resource retaining timer using the first resource retain time;

code for performing handover procedures;

code for determining whether the resource retaining timer is within a threshold of expiring;

code for sending a second handover indication message including a second resource retain time to the serving base station if the resource retaining timer is within the threshold of expiring; and code for restarting the resource retaining timer using the second resource retain time.

23. A computer-program product for extending a resource retain time for a serving base station in a wireless communication system, the computer-program product comprising a non-transitory computer-readable medium having instructions thereon, the instructions comprising:

code for receiving a first handover indication message from a mobile station, wherein the first handover indication message includes a first resource retain time;

code for starting a resource retaining timer using the first resource retain time;

code for waiting for the mobile station to perform handover procedures;

code for receiving a second handover indication message including a second resource retain time from the mobile station; and code for restarting the resource retaining timer using the second resource retain time.

* * * * *